(12) United States Patent
Girotto et al.

(10) Patent No.: US 12,191,726 B2
(45) Date of Patent: Jan. 7, 2025

(54) COOLING COMPONENT FOR ELECTRIC MOTOR

(71) Applicant: TEXA DYNAMICS S.R.L., Monastier di Treviso (IT)

(72) Inventors: Adriano Girotto, Monastier di Treviso (IT); Massimiliano Giacometti, Monastier di Treviso (IT)

(73) Assignee: TEXA DYNAMICS S.R.L., Monastier di Treviso (IT)

( * ) Notice: Subject to any disclaimer, the term of this patent is extended or adjusted under 35 U.S.C. 154(b) by 857 days.

(21) Appl. No.: 16/978,827

(22) PCT Filed: Mar. 7, 2019

(86) PCT No.: PCT/IB2019/051846
§ 371 (c)(1),
(2) Date: Sep. 8, 2020

(87) PCT Pub. No.: WO2019/171318
PCT Pub. Date: Sep. 12, 2019

(65) Prior Publication Data
US 2021/0075282 A1  Mar. 11, 2021

(30) Foreign Application Priority Data
Mar. 8, 2018 (IT) .......... 102018000003388

(51) Int. Cl.
*H02K 3/24* (2006.01)
*H02K 5/20* (2006.01)
*H02K 9/197* (2006.01)

(52) U.S. Cl.
CPC ............ *H02K 3/24* (2013.01); *H02K 5/203* (2021.01); *H02K 9/197* (2013.01)

(58) Field of Classification Search
CPC  H02K 3/24; H02K 5/20; H02K 5/203; H02K 9/19; H02K 9/193; H02K 9/197
(Continued)

(56) References Cited

U.S. PATENT DOCUMENTS

2009/0195108 A1 * 8/2009 Rippel ............... H02K 3/48
310/58
2015/0222151 A1 * 8/2015 Semken ............. H02K 1/28
29/452

(Continued)

FOREIGN PATENT DOCUMENTS

FR         3004600 A1 * 10/2014 ............ H02K 5/20
TW       200911101 A  *  3/2009
(Continued)

OTHER PUBLICATIONS

Devambe (FR 3004600 A1) English Translation (Year: 2014).*
Chen (TW 200911101 A) English Translation (Year: 2009).*

*Primary Examiner* — Tulsidas C Patel
*Assistant Examiner* — Robert E Mates
(74) *Attorney, Agent, or Firm* — Rivka Friedman

(57) ABSTRACT

A component (20; 18; 100) is described for cooling the windings of an electric motor (10) comprising: an outer ring (30), an inner ring (40) concentric to the outer ring, linear segments (50) extending radially from the inner ring towards the outer ring, wherein the rings (30, 40) and the segments (50) are internally hollow and joined together to form a continuous channel inside them capable of carrying a cooling fluid along a path that stats at a ring and passes to the other ring, preferably coming back to the starting ring, the rings (30, 40) and the segments (50) being arranged to delimit pass-through openings (36) able to accommodate and surround the motor windings.

15 Claims, 5 Drawing Sheets

Figure 1:
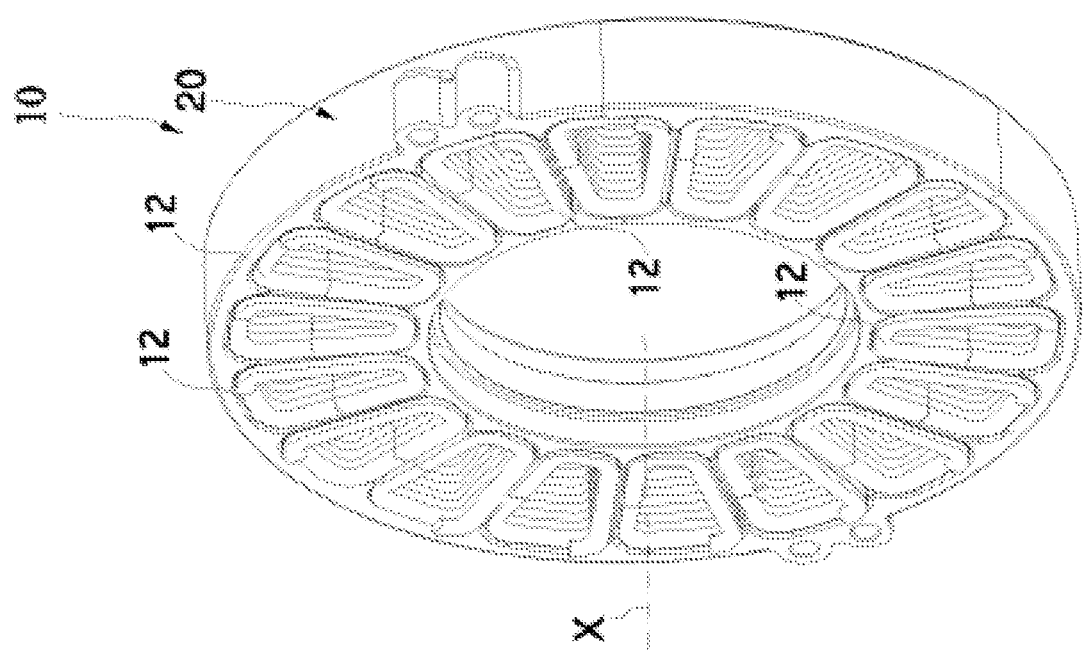

(58) Field of Classification Search
USPC .......................................................... 310/54
See application file for complete search history.

(56) References Cited

U.S. PATENT DOCUMENTS

2016/0138612 A1* 5/2016 Swett ...................... F25B 1/053
                                                                                62/513
2019/0207457 A1* 7/2019 Hamiti ................... H02K 5/203

FOREIGN PATENT DOCUMENTS

WO    WO-2016156886 A1 * 10/2016
WO    WO-2017194872 A1 * 11/2017 ............... H02K 1/20

* cited by examiner

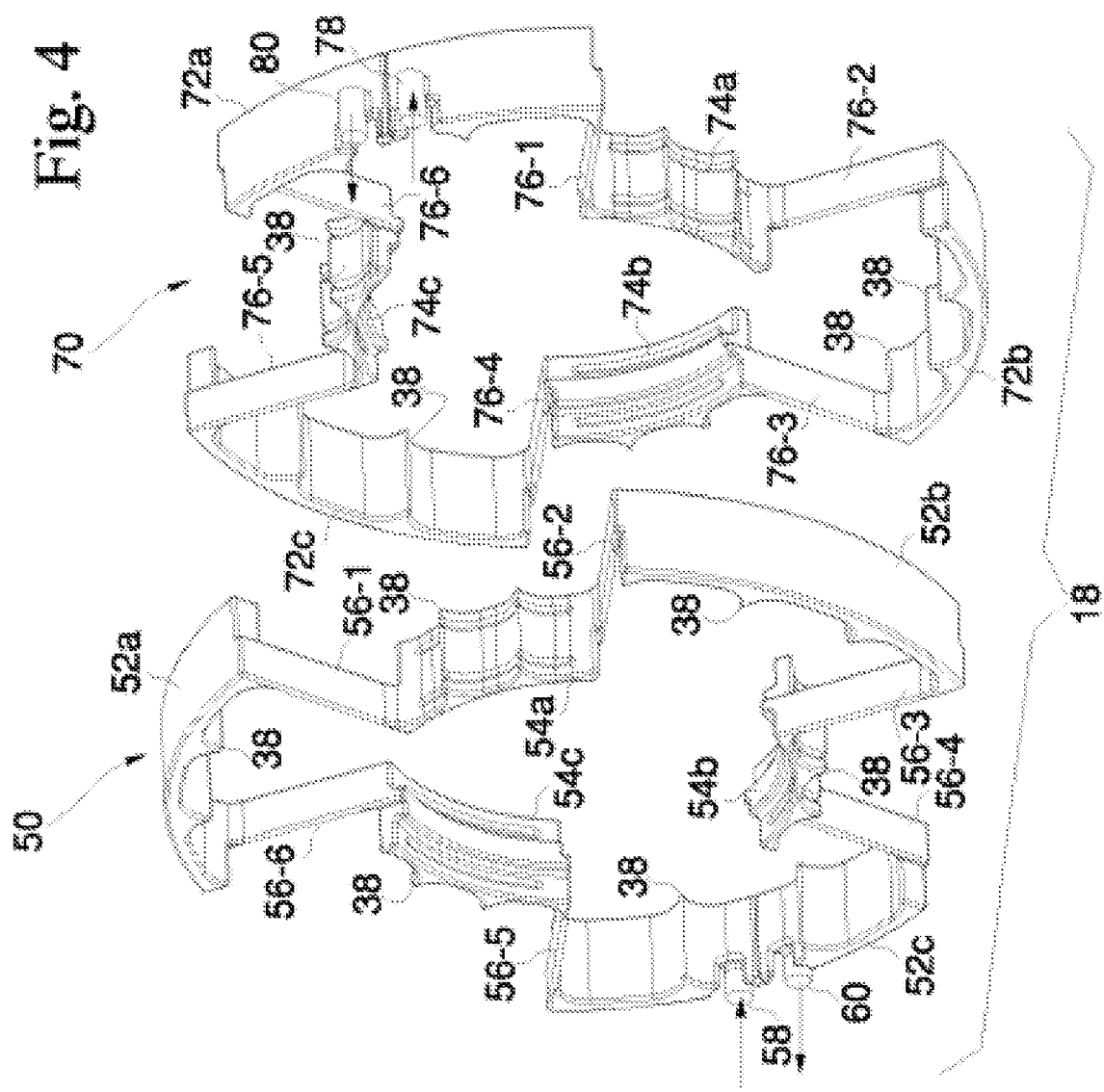

COOLING COMPONENT FOR ELECTRIC MOTOR

The invention relates—in general—to a cooling component for an electric motor, e.g. mounted on electric vehicles. The component may be advantageously applied mainly to high-power electric motor for vehicles, taken here as an example.

High-powered vehicles have electric motors with nominal powers of hundreds of KW, hence the primary need to cool them.

Usually two cooling systems are used: the oil bath and the peripheral water circuit. By an oil bath, borrowed from the transformer technology, the motor windings are immersed in oil, which then exchanges heat with a separate water circuit. The peripheral water circuit consists of a ring run by water that develops around the motor.

The major defect of the oil bath is the lower thermal transfer capacity compared to water. The major defect of the peripheral water circuit is the reduced heat exchange surface of the water circuit, which circulates far from the windings to be cooled.

The main object of the invention is to improve this state of the art.

Another object is to achieve a more efficient cooling system.

These objects are achieved with a component and/or method according to the appended claims, in which the dependent ones define advantageous variants.

A component is proposed to cool the windings of an electric motor, e.g. mounted on electric vehicles, comprising
an outer ring,
an inner ring concentric to the outer ring,
segments that extend radially from the inner ring towards the outer ring,
wherein the rings and the segments are internally hollow and are connected to form one or more continuous channels within them capable of transporting a cooling fluid along a path that passes from a ring to the other.

The rings and segments are arranged to form or delimit pass-through openings capable of accommodating and surround the windings.

The component allows the fluid to circulate around the windings, increasing the heat withdrawing area. Furthermore, the continuous channel ensures a watertight seal with respect to the electrical circuit of the windings, so water can be used as a fluid to take advantage of its high thermal capacity.

The described method may be used for radial motors and axial motors. The description that follows and the drawings show the application to axial flow motors.

Preferably, the rings and segments are internally hollow and connected to form a continuous channel within them capable of transporting a cooling fluid along a path that starts on a ring, passes into the other ring and returns to the starting ring.

Preferably, for constructive simplicity, the outer ring and the inner ring describe a circumference.

Preferably, for constructive simplicity, the segments are linear segments.

Preferably, for constructive simplicity, the outer ring and the inner ring lie substantially on a plane and are substantially coplanar.

Preferably, the outer ring, the inner ring and the segments are hollow shells, in particular made of electrically insulating material (technopolymers) loaded with materials that increase its thermal transmission. Even more preferably, the outer ring, the inner ring and the segments are shells made by 3D printing.

Preferably, to give the component strength and increase the transmission of the heat generated from the windings, the outer ring, the inner ring and the segments are embedded in a hardened matrix, e.g. resin.

Preferably, the continuous channel forms a path that completes a complete turn around the center of the rings, so as to take heat extensively from the windings.

Preferably the segments extend radially along an axis passing through the center of the rings, and in particular with polar symmetry with respect to this center. As a result, the segments form for the rings a sort of sunburst spoke pattern that advantageously laps the sides of the windings and removes heat therefrom.

We will call these segments spokes.

Preferably there is more than one continuous channel within the component, in particular two or more conduits. Multiple channels allow faster heat dissipation and a balance of the heat disposal, thereby avoiding for example that the fluid in the final part of a channel is too hot to remove heat effectively.

Preferably, to implement more than one continuous channel within the component, the component is formed by the assembly of two or more superimposed and isolated parts, where each part implements, as defined in general for the component, a continuous channel or circuit isolated from the others for the flowing of the cooling fluid.

It is convenient that the component thus modular is a uniform solid, e.g. for ease of assembly.

Furthermore, for ease of construction it is convenient that the two or more parts overlapped and isolated from each other can be overlappable modules or overlappable pieces by shape-coupling, to guarantee a final composite component with simple and uniform geometry.

E.g. the two or more overlapping and isolated parts are partitions of a regular solid or prism, e.g. a rotation solid like a cylinder.

For example, if there are $N \geq 2$ parts overlapping and isolated from each other, each of them consists of the fitting and/or union of
one or more fractions of the outer ring,
one or more fractions of the inner ring,
joining segments for said fractions.

A preferred structure for the two or more superimposed and isolated parts is the following.

With $N \geq 2$ parts overlapping and isolated from each other, and called $P=N*k$, with k a natural number $\geq 1$, the number of P subdivisions of a round angle, each N-th part consists of the composition and/or joining of
k angular fractions of the outer ring,
k angular fractions of the inner ring,
$2*k$ fitting segments for the ends of said $2*k$ angular fractions.

Preferably each k-th angular fraction of a ring develops over an arc of a circumference included in an angle of 360/P degrees.

The k angular fractions of the outer ring and the k angular fractions of the inner ring of a said part are hollow shells adapted to convey the cooling fluid. The said fitting segments of a said part are hollow shells adapted to convey the cooling fluid between the angular fractions of the outer ring of that part and the angular fractions of the inner ring of that part, or vice versa.

A preferred structure for the hollow segments of each of said two or more parts superposed and isolated from each other is that the segments form a partition of an overall segment having a thickness equal to that of all the overlapping rings.

Preferably, to maximize heat dissipation, said pass-through openings have a contour complementary to the perimeter of the surrounding windings. In particular, the surface of the inner edge of the outer ring and the surface of the outer edge of the inner ring comprise cusps with tips directed radially and facing the cusps of the opposite edge.

Said assembly of two or more overlapping and isolated parts constitutes a first embodiment. According to a different embodiment, the component may be produced more simply, being formed, preferably as a single-piece, by
an outer ring,
an inner ring concentric to the outer ring,
a plurality of, e.g. linear, spokes extending radially from the inner ring towards the outer ring,
wherein the rings and spokes are internally hollow to have internal channels, which channels are connected to form a continuous channel inside them capable of transporting a cooling fluid along a path that passes from one ring to the other,
the rings and spokes being arranged to form or delimit pass-through openings capable of accommodating and surround the windings.

Preferably each pass-through opening is configured to accommodate and surround only one winding. Thus each winding is surrounded on two opposite sides by two spokes that cool it. This construction, which increases the number of virtual short-circuited loops around the windings, is possible if the eddy currents induced in the component are not excessive, a condition which is obtained with appropriate choice of material, see below. Even more preferably, each pass-through opening has an annular shape, without cusps; in particular it consists of two equal radial walls joined by two curved walls, wherein
one curved wall is a surface of the inner ring with a first curvature radius, and
the other curved wall is a surface of the outer ring with a second curvature radius,
wherein the first curvature radius is smaller than the second curvature radius.

Preferably each spoke comprises two or more radial channels, fluidly isolated from each other and preferably parallel to each other, which connect a circular channel inside the outer ring with a circular channel present inside the inner ring. Thus the volume of the spoke is run internally by multiple channels for the benefit of a better and more uniform heat withdrawal from the windings.

A very simple constructive variant envisages that the component comprises only one point or area for the introduction—and the supply—of cooling fluid, for example a point or area communicating with the channel of a ring, e.g. the outer one. It is possible that load and/or friction problems prevent or hinder a homogeneous flow of fluid throughout the component, because in order to reach or cross the internal channels of the more distant spokes the fluid must cover more ground. To solve this problem, preferably the component comprises means for unevenly distributing the fluid flowing within the various spokes, i.e. so that some spokes carry more fluid directed by a ring to the other ring with respect to other spokes.

In particular, said means are configured to increase the flow of fluid within a spoke that passes from a ring to the other and to decrease the flow of fluid inside the same spoke that returns to the ring from which it has started. Thus, the spokes may have an equal number of internal channels, and in use the means distribute the fluid between these channels thereby creating in each spoke two sub-groups of channels, where each sub-group carries fluid only from a ring to the other (one group for the flow and one group for the return of the fluid).

Preferably said means for distributing are configured to distribute the fluid, injected in correspondence of said injection point or area and directed towards the other ring through the spokes, proportionally to the distance of the spokes from said point or area. The more a spoke is distant from said injection point or area, the more fluid it carries to the other ring.

Preferably, said means for distributing are made of one or more separating walls configured to isolate in each spoke one or more channel inlets internal to the spoke from the outlets of the remaining channels of the spoke.

The one or more separating walls may be present for each spoke at the inlets related to only one ring, or at the inlets related to both rings.

Preferably the one or more separating walls are made through a continuous annular wall surrounding a ring and extending to meet all the inlets of the channels of each spoke for that ring.

To improve the distribution of the cooling fluid and/or facilitate its flow from a ring to the other, the inner ring preferably comprises a circular series of superficial recesses on the side surface facing the outer ring, wherein there is a superficial recess in front of each outlet of the inner channel of a linear segment.

Still to improve the distribution of the cooling fluid, more preferably each superficial recess of a circular series is made communicating by a channel with an adjacent recess of the other circular series. In particular, the channel's cross-section is not the same for all pairs of recesses but increases as its position, considered along the circumference of the inner ring, approaches the fluid's outlet from the stator. In this way the fluid can flow more easily in a channel with a larger cross-section, and the channels have increasing cross-section as they are crossed by fluid that, due to the load losses, has less ability to exit the stator. In essence the channels with increasing cross-section compensate for frictions or flow losses.

In each aspect of the invention variations may be made to improve said component for cooling the windings.

If the component is made of electrically conductive material, some applications may suffer some problems. The windings generate dispersed magnetic flux, which induces eddy currents along said pass-through openings. Moreover, the windings constitute the primary of a transformer of which said openings form a short-circuited secondary, therefore the component heats up. Finally, the windings also constitute one plate of a parasitic capacitor, the other being the metallic mass of the component. As the windings are powered with switched voltage, the capacitor circulates eddy currents and brings the component casing (and therefore the vehicle) to an off-ground voltage, which can be dangerous.

The solution to these problems is to make the component in electrically insulating material, such as e.g. plastic or more preferably technopolymer.

In each aspect of the invention the cooling fluid may be introduced into the outer and/or outer ring.

Another aspect of the invention concerns a method for constructing a component as defined above, in one or each variant, with the phase of making the rings and segments through 3D printing.

3D printing facilitates both the construction of a channel with very thin walls (and therefore high thermal conductivity), and a very complex labyrinth of channels.

The method envisages for example to print loaded plastic.

The method envisages for example to strengthen the component by embedding in a hardened matrix, e.g. resin, the piece printed with 3D printing.

To solve the problem of assembling the various components of the stator in a sealed manner, in a preferred variant the outer ring and/or inner ring comprise peripheral circular grooves in which a sealant is deposited to seal the cooling fluid inside the outer ring and/or inner ring.

Another aspect of the invention concerns a watertight assembly method of the components of the stator, creating peripheral circular grooves on the outer ring and/or inner ring and then depositing inside them a sealant to seal the cooling fluid inside the outer ring and/or the inner ring.

The sealant may be e.g. a resin or a solidifying fluid, or a polymeric foam or an adhesive. E.g. the sealant may be polyurethane.

In particular, on said circular grooves there are applied, on opposite sides of the stator, two closing elements (e.g. circular lids) that adhere simultaneously to the deposited sealant on at least one ring, preferably on the two rings.

Another aspect of the invention concerns an electric vehicle equipped with the motor or stator as defined above in one or each of the variants.

In the various aspects of the invention the inner ring, the outer ring and the spokes or linear segments are comprised in one single piece. Or in a different variant the inner ring, the outer ring and the assembly of all of the spokes or all of the linear segments are independent pieces, separated and then assembled together.

Figure 3:
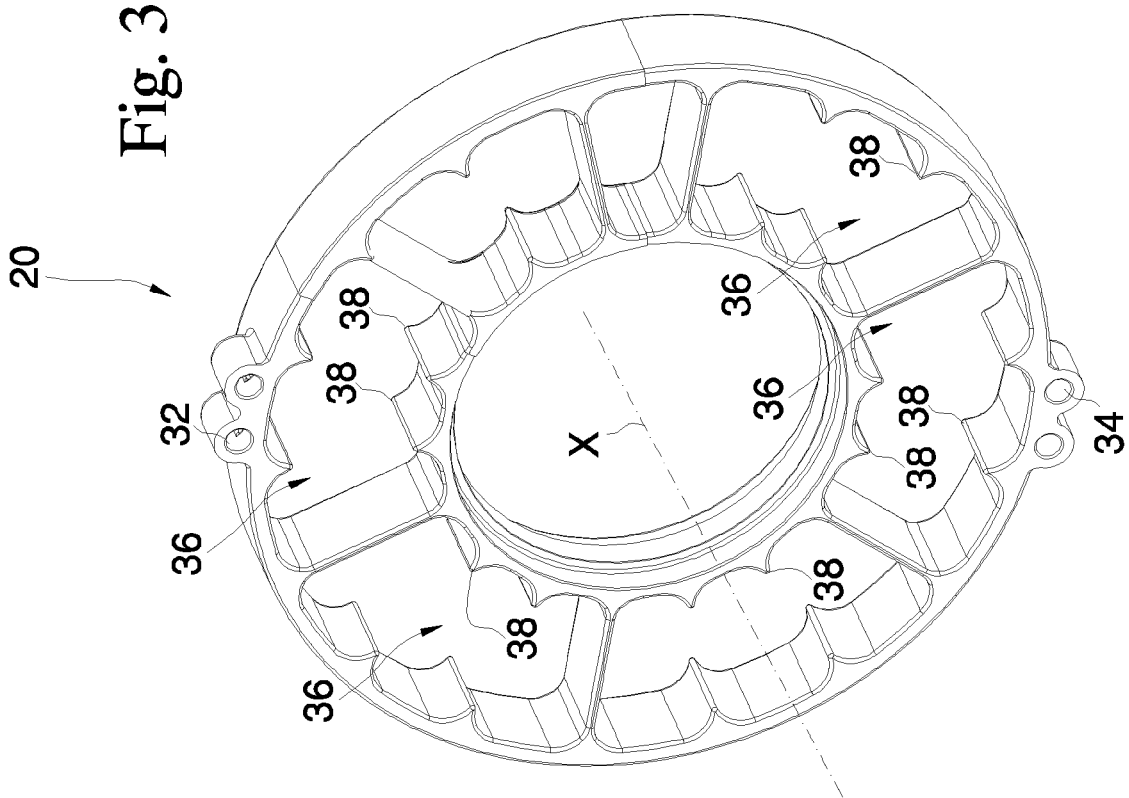
Figure 2:
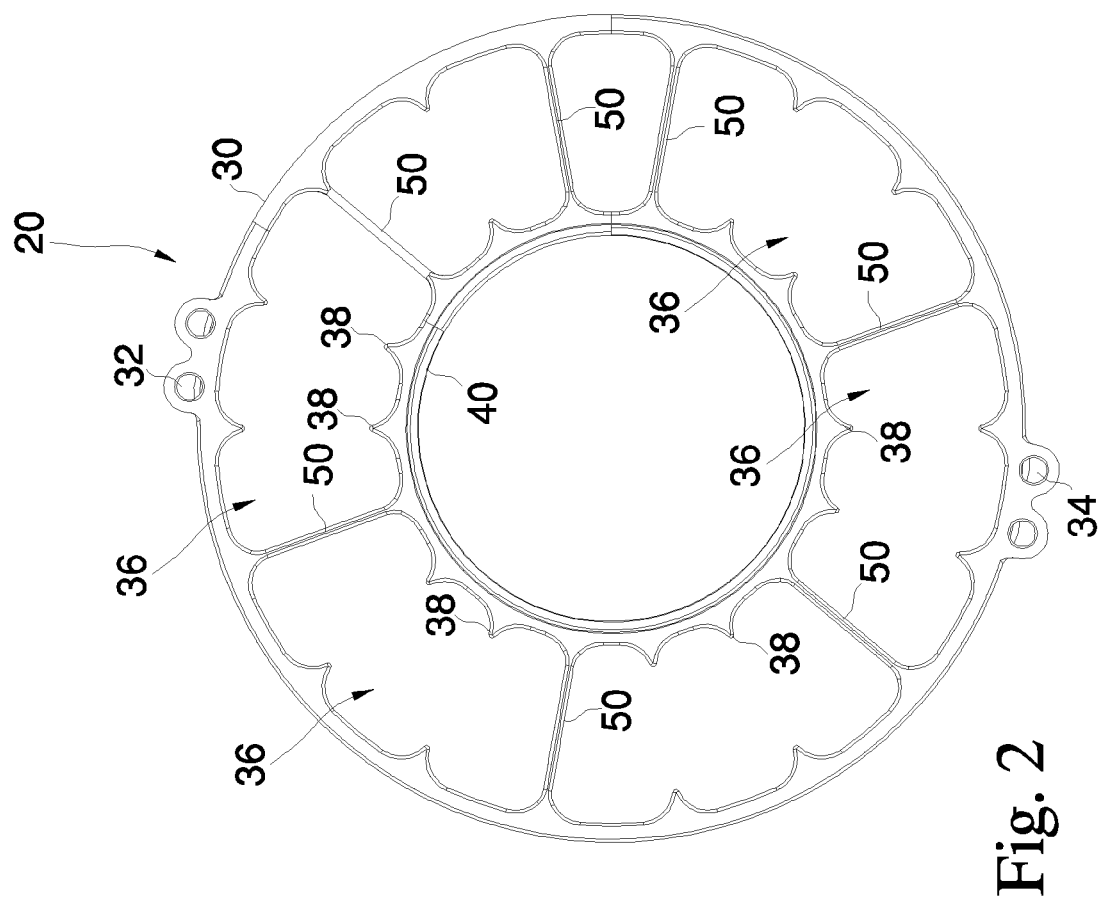
Figure 5:
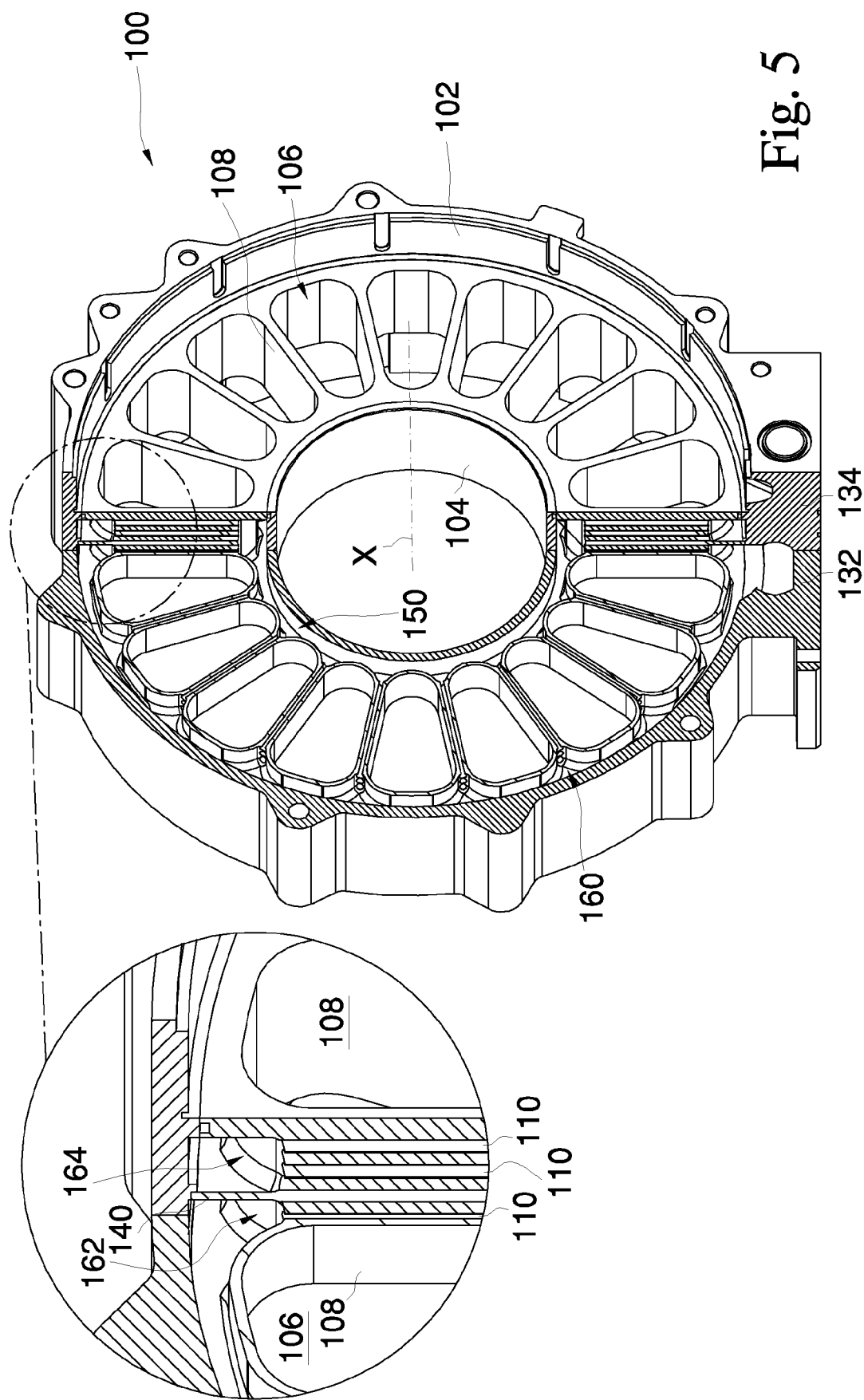
Figure 7:
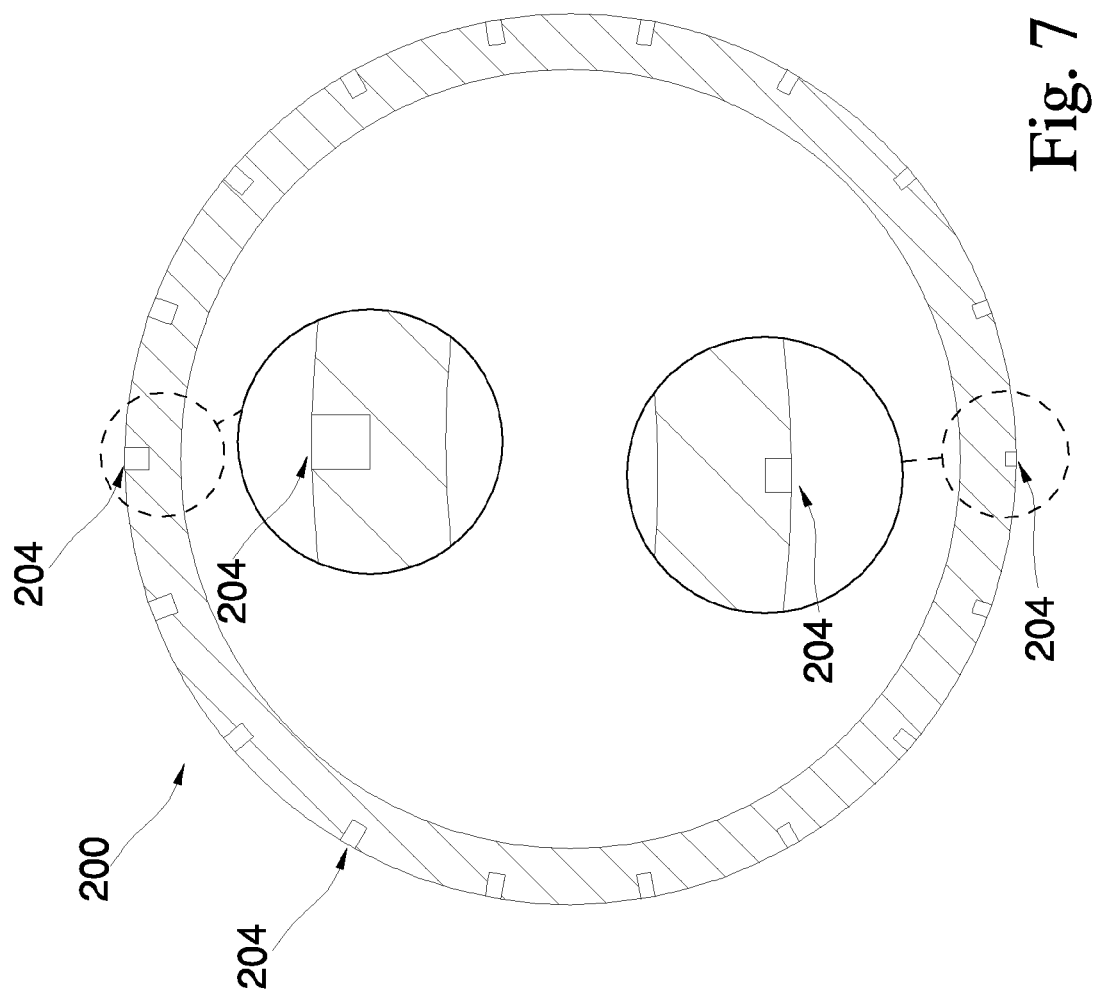
Figure 6:
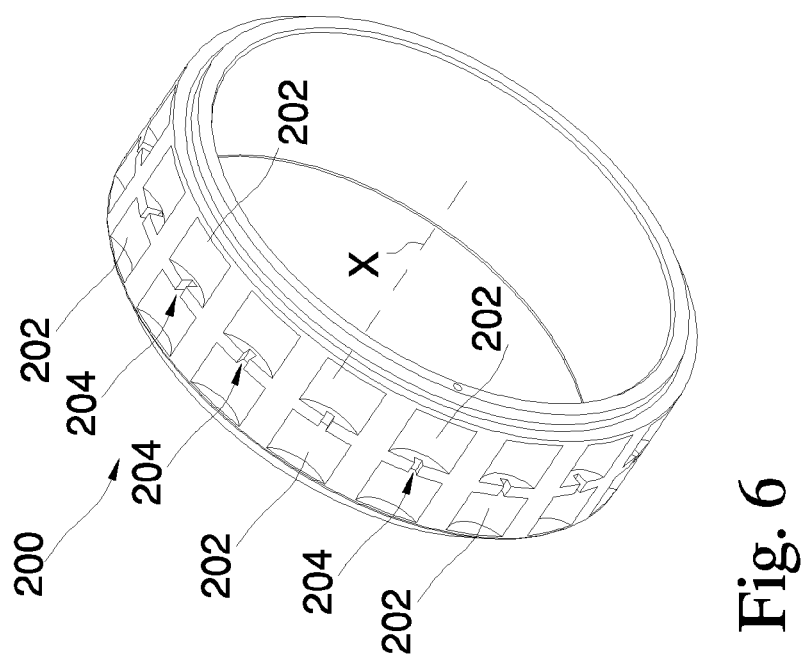

The advantages of the invention will be clearer from the following description of a preferred embodiment of a cooling component, referring to the enclosed drawing in which FIG. 1 shows a three-dimensional view of a stator, FIG. 2 shows a three-dimensional view of the component, FIG. 3 shows a front view of the component, FIG. 4 shows a three-dimensional view of a variant of the component, FIG. 5 shows a three-dimensional view, partially in cross-section, of a further variant of the component, FIG. 6 shows a three-dimensional view of a variant of the component;

FIG. 7 shows a cross section view of the variant of FIG. 6 according to a plane orthogonal to the X axis;

In order not to crowd the drawings, some equal elements are not all marked with a number.

FIG. 1 shows a stator 10 of an axial-flow electric motor, where there are visible windings 12 arranged circularly around an axis X and surrounded by a cooling component 20, isolated in FIGS. 2 and 3.

The component 20 consists of an outer circular ring 30, an inner circular ring 40 concentric to the outer ring 30, and rectilinear segments or spokes 50 (in example seven) which join together radially the two rings 30, 40.

The outer ring 30 and the inner ring 40 are centered on the X axis.

Two adjacent segments 50 and the arcs of ring 30, 40 comprised by them delimit pass-through cavities 36 of perimeter complementary to three windings 12 set side by side. The number of segments or spokes 50 may vary, then varying the number of windings 12 placed side by side between two adjacent segments 50. To minimizing the empty spaces between the pack of windings 12 and the rings 30, 40, the latter comprise—respectively on the inner and outer edge—cusps 38 which occupy the empty space around the rounded profiles of the windings 12.

The rings 30, 40 and the segments 50 are hollow shells and generally form a continuous channel within them to transport a cooling fluid, which enters the component 20 from an inlet 32 and exits from a drain 34. To lengthen the path of the channel the inlet 32 and the drain 34 are e.g. arranged on the ring 30 in diametrically opposite points.

The circulation of the fluid inside the component 20 takes place along a path that involves at least once the two rings 30, 40 and at least two segments 50. That is, the fluid circulates inside the component 20 passing from the ring 30 to the ring 40 through a segment 50 and then passing from the ring 40 to the ring 30 through a different segment 50. During its flowing the fluid licks the windings 12 and subtracts heat from them.

The number of channels for the cooling fluid inside the component may vary, in particular the number of independent channels. Two or more separate channels can better remove heat from the windings 12, guaranteeing a more uniform operating temperature to the motor.

FIG. 4 shows an example with two channels running through the interior of a component 18 all around its center.

The component 18 comprises two parts 50, 70 superimposed and isolated from each other. Each part 50, 70 realizes a circuit for the fluid isolated from the other.

The part 50 (70) comprises three angular fractions 52a, 52b, 52c (72a, 72b, 72c) of outer ring and three angular fractions 54a, 54b, 54c (74a, 74b, 74c) of inner ring, joined together by six equal radial segments 56-1, 56-2, 56-3, 56-4, 56-5, 56-6 (76-1, 76-2, 76-3, 76-4, 76-5, 76-6).

The three angular fractions 52a, 52b, 52c (72a, 72b, 72c) and the three angular fractions 54a, 54b, 54c (74a, 74b, 74c) are arcs of circumference subtended by angles of 60 degrees, and are angularly separated from one another by 60 degrees. The six radial segments 56-1, 56-2, 56-3, 56-4, 56-5, 56-6 (76-1, 76-2, 76-3, 76-4, 76-5, 76-6) are arranged along the diagonals of an imaginary hexagon with center on the X axis.

The three angular fractions 52a, 52b, 52c (72a, 72b, 72c), the three angular fractions 54a, 54b, 54c (74a, 74b, 74c) and the six radial segments 56-1, 56-2, 56-3, 56-4, 56-5, 56-6 (76-1, 76-2, 76-3, 76-4, 76-5, 76-6) are internally hollow and their juxtaposition creates an overall channel for the cooling fluid.

The channel in component 50 (70) starts from an inlet 58 (78), runs through all the hollow elements of the component 50 (70), and ends with a drain 60 (80), placed next to the inlet 58 (78) on the fraction 52c (72c).

The inlets 58 (78) and the outlets 60 (80) may also be arranged in a radial direction on the outer surface of the outer ring 30.

Thus, in the component 50 (70) the fluid enters the inlet 58 (78) and runs in sequence: half of fraction 52c (72a), the segment 56-5 (76-1), the fraction 54c (74a), the segment 56-6 (76-2), the fraction 52a (72b), the segment 56-1 (76-3), the fraction 54a (74b), the segment 56-2 (76-4), the fraction 52b (72c), the segment 56-3 (76-5), the fraction 54b (74c), the segment 56-4 (76-6), half of fraction 52c (72a), and finally comes out from the drain 60 (80). The arrows indicate the direction of flow of the fluid.

By way of example, in the component 50 the fluid may flow in a clockwise direction around the X axis, and in the component 70 in a clockwise direction around the X axis. However, the flow directions of the fluid in the components 50, 70 can be varied to improve thermal transfer, e.g. with countercurrent flows.

The components 50, 70 can interpenetrate one another, because where one has a void the other has a solid portion. 3D printing allows them to have a structure otherwise impossible to mechanically couple. That's why the radial segments 56-1, 56-2, 56-3, 56-4, 56-5, 56-6 (76-1, 76-2, 76-3, 76-4, 76-5, 76-6) connect the end of the angular fractions 52a, 52b, 52c, 54a, 54b, 54c (74a, 74b, 74c, 72a, 72b, 72c) with an alternating pattern, that is, the radial segments 56-1, 56-2, 56-3, 56-4, 56-5, 56-6 (76-1, 76-2, 76-3, 76-4, 76-5, 76-6) are attached to each angular fraction 52a, 52b, 52c, 54a, 54b, 54c (74a, 74b, 74c, 72a, 72b, 72c) in correspondence of opposite angles and relative to the diagonals of that angular fraction 52a, 52b, 52c, 54a, 54b, 54c (74a, 74b, 74c, 72a, 72b, 72c).

FIG. 5 shows another cooling component 100 of an electric motor (windings around the X axis not shown).

The component 100 consists of an outer circular ring 102, an inner circular ring 104 concentric to the outer ring 102, and by rectilinear segments or spokes 108 which join radially the two rings 102, 104, which are centered on the X axis.

The adjacent segments or spokes 108 and the arches of ring 102, 104 comprising them delimit pass-through cavities 106 of perimeter complementary to a single winding. The number of segments or spokes 108 can vary, then varying the number of windings that are on the component 100.

The rings 102, 104 and the segments or spokes 108 are hollow shells and altogether form inside a continuous channel to transport a cooling fluid, which enters the component 100 from an inlet 132 and exits from a drain 134, placed on the ring 102 at the same point.

The circulation of the fluid inside the component 100 takes place along a path that starts from the inlet 132, runs circularly over the whole ring 102 to reach all the spokes 108, reaches the ring 104, runs circularly over the whole ring 104 to reach all the spokes 108 and then returns to the ring 102 through all the spokes 108. That is, the fluid circulates inside the component 100 by passing from the ring 102 to the ring 104 through all the spokes 108 and then by passing from the ring 104 to the ring 102 through all the same spokes 108. During the flow the fluid licks all the windings and removes heat from them.

FIG. 5 indicates with 160 a circular channel inside the ring 102 through which the fluid can reach all the spokes 108. A circular channel inside the ring 104, through which the return fluid can reach all the spokes 108, is also indicated with 150

Unlike the variant of FIG. 4, each winding is now individually cooled on each side thereof. This construction, which sees an increase in the number of spokes 108, is possible by reducing the impact of eddy currents circulating in the casing of the component 100 around the windings, i.e. by building the component 100 out of electrically insulating material, e.g. in plastic or technopolymer.

In the zoom of FIG. 5 a preferred internal structure for the spokes 108 is shown. A or each spoke 108 internally comprises radial channels 110, parallel to each other, which pass through it radially to connect the channels 150, 160. The advantage is thus that the whole surface of the spoke 108 is capable of removing heat.

The zoom of FIG. 5 also illustrates a preferred internal structure for the channel 160. Since the cooling fluid could flow difficultly in the spokes which are more distant from the inlet 132, it is advantageous to compensate the load losses by distributing in a different way the flow of the fluid among the spokes 108. To this aim, in the channel 160 there is a dividing septum 140 which divides the channel 160 into two channels:

a flow channel 164 and a return channel 162 for the fluid.

The septum 140, for each spoke 108, separates and isolates some inlets of the channels 110 from the remaining inlets. Thus the septum 140 establishes, for each spoke 108, how many and which inlets of the channels 110 form part of the channel 162 or of the channel 164, in effect thereby establishing how many and which channels 110 in use will bring fluid to the ring 104 and how many and which channels 110 in use will return fluid from the ring 104 to the ring 102.

The septum 140 is configured so that there are more channels 110 carrying fluid to the ring 104 for the spokes 108 that are more distant from the point 132, and instead there are fewer channels 110 carrying fluid to the ring 104 for the spokes 108 which are closer to the point 132.

Thus the load loss is corrected and the fluid flow is uniform in each section inside the rings 102, 104.

Preferably the component 100 is constructed as a single piece.

The component 100 may be fed from the inner ring 104 by inverting the structure of the rings 102, 104.

FIGS. 6 and 7 show a preferred form of construction 200 for an inner ring such as the ring 104.

The inner ring 200 comprises on the outer side surface two equal circular series of grooves 202 which run parallel to the ring 200. The recesses 202 are arranged so that in front of each outlet from the spokes 108 of a channel 110 there is on the ring 200 a recess 202.

A recess 202 of a series is joined by a channel 204 with the nearest recess 202 of the adjacent circular series. The channel 204 extends parallel to the axis X.

The recesses 200 serve to decrease the dynamic resistance for the outgoing and incoming circulating fluid from/to the channels 110.

The channels 204 put two adjacent recesses 202 in communication, transferring from one to the other the cooling fluid that exits a channel 110 and re-enters the adjacent channel 110.

To improve the distribution of the fluid in all the channels 110, the section of the channel 204 (see FIG. 7) has a dimension that depends on the angular position with respect to the X axis. In particular, the cross-section of a channel 204 is greater as one moves away from the entrance of the fluid into the stator and as one approaches the fluid's exit from the stator.

FIGS. 8 and 9 show another preferred form of construction for a stator 300. Here the outer ring 302, the inner ring 304 and the spokes 306 are separate pieces, then assembled together. Or two among the outer ring 302, the inner ring 304 and the spokes 306 are integral pieces, then assembled to the third piece.

In any case, the problem arises of mounting the separated pieces together in a watertight and resistant manner.

A first solution is to apply O-rings along the peripheral circumference of the inner ring 304 and/or the outer ring 302 to seal the cooling fluid inside them.

A second solution is to provide the inner ring 304 and/or the outer ring 302 with peripheral circular grooves 308. A sealant can then be poured into the circular grooves 308. The sealant can be e.g. a resin or a solidifying fluid, or a polymeric foam or an adhesive. E.g. the sealant can be polyurethane.

In particular, the solution is practically more effective if after the grooves circular 308 are filled with the sealant two circular lids, which at the same time adhere to the sealant deposited on the two rings 302, 304, are applied on the opposite sides of the stator 300

The lid may also be used e.g. to stop-up open channels of the spokes.

Circular grooves like the grooves 308 may be made also on the spokes, to pour the sealant therein and increase the sealing effect.

Circular grooves like the grooves 308 may be made on one or both sides of the stator.

The invention claimed is:

1. A component for cooling windings of an axial-flux electric motor comprising:
   an outer ring,
   an inner ring concentric to the outer ring,
   linear segments extending radially from the inner ring towards the outer ring,
   wherein the rings and the linear segments are internally hollow and joined together to form a continuous channel inside them capable of carrying a cooling fluid along a path that starts at a ring and passes to the other ring,
   the rings and the linear segments being arranged to delimit pass-through openings able to accommodate and surround the windings,
   said pass-through openings having a contour complementary to a perimeter of the windings they surround,
   wherein a surface of an inner edge of the outer ring and a surface of an outer edge of the inner ring comprise cusps with tips directed radially and facing towards the cusps of the opposite edge.

2. The component according to claim 1, wherein the continuous channel is formed by two circular paths performing respectively a complete turn inside each ring and by a round-trip path for the cooling fluid inside each linear segment.

3. The component according to claim 2, wherein the linear segments comprise a plurality of internal channels, and the component comprises means for distributing, in correspondence of each linear segment, the cooling fluid circulating back and forth between the two rings among a plurality of internal channels;
   said means for distributing being configured to unevenly distribute the cooling fluid flowing within the linear segments so that some linear segment carries more fluid directed from a ring to the other ring with respect to other linear segments.

4. The component according to claim 3, wherein said means for distributing are adapted to distribute said cooling fluid as a function of a position of a linear segment on the component.

5. The component according to claim 3, wherein said means for distributing comprise a divider septum which extends inside a circular path of a ring for dividing into two groups said plurality of internal channels: a group for sending cooling fluid to the other ring and a group for receiving cooling fluid from the other ring.

6. The component according to claim 1, made of electrically insulating material, such as plastic or technopolymer.

7. The component according to claim 1, wherein the continuous channel forms a path that performs a complete turn around a center of the rings.

8. The component according to claim 1, characterized by being formed of an assembly of two or more parts superimposed and isolated from each other to implement a plurality of continuous channels, wherein each part is configured to create a respective continuous channel or circuit isolated from the other parts for a flowing of the cooling fluid.

9. The component according to claim 1, formed of
   a single-piece outer ring,
   an inner ring that is concentric to the outer ring and is one-piece,
   a plurality of linear spokes extending radially from the inner ring towards the outer ring and integral with one of the two rings,
   wherein the rings and the spokes are hollow internally to have internal channels, which channels are joined to form a continuous channel inside the rings and the spokes capable of transporting a cooling fluid along a path that passes from one ring to the other ring,
   the rings and the spokes being arranged to form or delimit pass-through openings capable of accommodating and surrounding the windings.

10. The component according to claim 1, wherein the outer ring, the inner ring and the linear segments are hollow shells, in particular made of aluminium or filled plastic.

11. The component according to claim 1, wherein
   the inner ring comprises, on an outer surface thereof, two circular series of recesses which face the outer ring,
   a pair or each pair of adjacent recesses are communicating via a channel, and
   in said a pair or each pair of adjacent recesses, one recess of the pair belongs to a series and the other recess belongs to the other series.

12. The component according to claim 1, wherein said continuous channel has a greater cross-section as said cross-section is closer to a cooling fluid exit from the component.

13. The component according to claim 11, wherein said a pair or each pair of adjacent recesses are communicating via a channel made on said outer surface.

14. The component according to claim 1, wherein said path starts at a first one of the rings and passes to the other ring coming back to the first one of the rings.

15. The component according to claim 1, wherein the outer ring and the inner ring are configured to:
   describe a circumference,
   lie substantially on a plane, and
   be substantially coplanar.

* * * * *